US008694792B2

(12) United States Patent
Whillock

(10) Patent No.: US 8,694,792 B2
(45) Date of Patent: Apr. 8, 2014

(54) BIOMETRIC BASED REPEAT VISITOR RECOGNITION SYSTEM AND METHOD

(75) Inventor: Rand P. Whillock, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 1776 days.

(21) Appl. No.: 11/707,608

(22) Filed: Feb. 16, 2007

(65) Prior Publication Data

US 2008/0201579 A1 Aug. 21, 2008

(51) Int. Cl.
*G06F 21/00* (2013.01)

(52) U.S. Cl.
USPC .................................. 713/186; 705/18; 902/3

(58) Field of Classification Search
USPC ................................................ 705/18; 902/3
See application file for complete search history.

(56) References Cited

U.S. PATENT DOCUMENTS

| | | | | |
|---|---|---|---|---|
| 6,072,894 | A | 6/2000 | Payne | 382/118 |
| 6,119,096 | A | 9/2000 | Mann et al. | 705/5 |
| 6,142,876 | A * | 11/2000 | Cumbers | 463/25 |
| 6,234,900 | B1 * | 5/2001 | Cumbers | 463/29 |
| 6,554,705 | B1 * | 4/2003 | Cumbers | 463/29 |
| 6,972,693 | B2 | 12/2005 | Brown et al. | 340/907 |
| 6,999,606 | B1 | 2/2006 | Frischholz | 382/118 |
| 7,175,528 | B1 | 2/2007 | Cumbers | A63F 9/24 |
| 2003/0225767 | A1 | 12/2003 | Archibald | 707/10 |
| 2004/0151347 | A1 | 8/2004 | Wisniewski | 382/115 |
| 2004/0240711 | A1 | 12/2004 | Hamza et al. | 382/118 |
| 2005/0063569 | A1 | 3/2005 | Colbert et al. | 382/118 |
| 2006/0082438 | A1 | 4/2006 | Bazakos et al. | 340/5.82 |
| 2006/0082439 | A1 | 4/2006 | Bazakos et al. | 340/5.82 |
| 2006/0089754 | A1 | 4/2006 | Mortenson | 701/1 |
| 2006/0165266 | A1 | 7/2006 | Hamza | 382/117 |

FOREIGN PATENT DOCUMENTS

| | | | | |
|---|---|---|---|---|
| EP | 1696393 A2 | 8/2006 | G07C 9/00 |
| GB | 2369222 A | 5/2002 | G07C 9/00 |
| WO | WO 03/034361 A1 | 4/2003 | G08B 15/00 |
| WO | WO 03/060846 A2 | 7/2003 | |

OTHER PUBLICATIONS

PCT—Notification of Transmittal of the international Search Report and the Written Opinion of the International Searching Authority, or the Declaration, Date of Mailing Jun. 20, 2008.

* cited by examiner

*Primary Examiner* — Kaveh Abrishamkar

(74) *Attorney, Agent, or Firm* — Luis M. Ortiz; Kermit D. Lopez; Ortiz & Lopez, PLLC

(57) ABSTRACT

A biometric authorization method, system, and program product Biometric data associated with a subject can be detected and acquired. Thereafter, particular biometric features can be segmented and extracted from the biometric data. These particular biometric features are then compared to biometric data previously stored in a database in order to determine if the particular biometric features match the biometric data previously stored in the database and thereby rapidly and automatically determine if the subject comprises a repeat visitor.

19 Claims, 3 Drawing Sheets

BIOMETRIC BASED REPEAT VISITOR RECOGNITION SYSTEM AND METHOD

TECHNICAL FIELD

Embodiments are generally related data-processing devices and systems. Embodiments are also related to biometric security applications. Embodiments are additionally related to techniques and devices for recognizing repeat visitors or customers.

BACKGROUND OF THE INVENTION

Security for electronic and mechanical systems has rapidly become an important issue in recent years. With the proliferation of computers, computer networks and other electronic device and networks into all aspects of business and daily life, the concern over secure file and transaction access has grown tremendously. The ability to secure data and transactions is particularly important for financial, medical, education, government, military, and communications endeavors. In addition, there is also a continuing to need to permit access to secure facilities in both private and public facilities, buildings, and compounds.

Using passwords is a common method of providing security for electrical or mechanical systems. Password protection and/or combination type locks are employed for computer network security, automatic teller machines, telephone banking, calling cards, telephone answering services, buildings, factories, houses and safes. These systems generally require the knowledge of an entry code that has been selected by or provided to a user or has been configured in advance.

Pre-set codes are often forgotten; however, as users have no reliable method of remember them. Writing down the codes and storing them in close proximity to an access control device (e.g., a combination lock) results in a secure access control system with a very insecure code. Alternatively, the nuisance of trying several code variations renders the access control system more of a problem than a solution.

Password systems are known to suffer from other disadvantages. Usually, a user specifies passwords. Most users, being unsophisticated users of security systems, choose passwords that are relatively insecure. As such, many password systems are easily accessed through a simple trial and error process.

To secure access to particular areas, such as buildings, the most common building security system relied on traditionally has been a security guard. A security guard reviews identification cards and compares pictures thereon to a person carrying the card. The security guard provides access upon recognition or upon other criteria. Other building security systems use card access, password access, or another secure access approach. Unfortunately, passwords and cards have the same drawbacks when used for building security as when used for computer security.

As computer networks are increasingly used to link computer systems together, applications have been developed to allow a user on a client computer system to access a service on a host computer system. For example, a user on a client system may be able to access information contained in a database on a host computer system. Unfortunately, along with this increased accessibility comes increased potential for security problems. For example, communications, including authentication, between a client system and a host system can be intercepted and tampered with while in transit over the computer network. This may allow third parties or malicious users on a client computer system to gain access to, or security codes for, a service on a host computer system without proper authorization.

A number of systems have been developed to ensure that users do not gain unauthorized access to host computer systems. As explained above, some systems prompt a user for passwords. Such systems may also rely on PIN numbers, before granting the user access to the host computer system. As indicated above, however, passwords and PIN numbers may be forgotten or may fall into the wrong hands. Additionally, using passwords and PIN numbers for security purposes places an additional burden on institutions because passwords or PIN numbers require additional machinery and human resources to deal with customers when customers forget passwords or PIN numbers, or when customers request that passwords or PIN numbers be changed.

As an alternative to traditional security systems, such as security guards, passwords or PIN numbers, biometric authentication systems have been developed to authorize accesses to various electronic and mechanical systems. Biometrics can generally be defined as the science of utilizing unique physical or behavioral personal characteristics to verify the identity of an individual. Biometric authentication systems are typically combined with hardware and software systems for automated biometric verification or identification. Biometric authentication systems receive a biometric input, such as a fingerprint or a voice sample, from a user. This biometric input is typically compared against a prerecorded template containing biometric data associated with the user to determine whether to grant the user access to a service on the host system.

A biometric security access system can thus provide substantially secure access and does not require a password or access code. A biometric identification system accepts unique biometric information from a user and identifies the user by matching the information against information belonging to registered users of the system. One such biometric system is a fingerprint recognition system.

In a fingerprint biometric system input transducer or sensor, the finger under investigation is usually pressed against a flat surface, such as a side of a glass plate; the ridge and valley pattern of the finger tip is sensed by a sensing means such as an interrogating light beam. In order to capture an image of a fingerprint, a system may be prompted through user entry that a fingertip is in place for image capture. Another method of identifying fingerprints is to capture images continuously and to analyze each image to determine the presence of biometric information such as a fingerprint.

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface. In other cases, the illumination surface may be parallel to the first surface. Fingerprint identification devices of this nature are generally used to control the building-access or information-access of individuals to buildings, rooms, and devices such as computer terminals.

One non-limiting example of a facial biometric authentication technique is disclosed in U.S. Patent Application Publication No. 20040240711, entitled "Face Identification Verification Using 3 dimensional Modeling," which published on Dec. 2, 2004 to Rida Hamza et al., and is assigned to Honeywell International Inc. Note that U.S. Patent Application Publication No. 20040240711 is incorporated herein by reference in its entirety. An example of an iris biometric authentication system and method is disclosed in U.S. Patent Application Publication No. 20060165266, entitled "Iris Recognition System and Method," which published on Jul. 27, 2006 to Rida Hamza and is also assigned to Honeywell International Inc. U.S. Patent Application Publication No. 20060165266 is incorporated herein by reference in its entirety.

Certain establishments have strong incentives to recognize repeat visitors or customers. An automated technique for recognizing a repeat visitor and provide users with information about the visitor's past visits would be useful for a number of applications. Casino operators, for example, would benefit from a system that could identify repeat "high roller" visitors and quickly provide casino personnel information on their gaming and hospitality preferences and other information based on previous visits. This would allow casinos to provide more personalized service to a larger number of customers. It is not however desirable to put a visitor out by asking for identification or other biometric based identifier such as a fingerprint. What is needed is a system that can unobtrusively identify a person based on standoff collected biometrics and then provide biographical information and visit history information on the subject.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing method, system and program product.

It is another aspect of the present invention to provide for an improved biometric authorization application.

It is a further aspect of the present invention to provide for improved techniques and devices for recognizing repeat visitors or customers.

The aforementioned aspects and other objectives and advantages can now be achieved as described herein. A biometric authorization method, system, and program product are disclosed. In general biometric data associated with a subject can be detected and acquired. Thereafter, particular biometric features can be segmented and extracted from the biometric data. These particular biometric features can be then compared to biometric data previously stored in a database in order to determine if the particular biometric features match the biometric data previously stored in the database and thereby rapidly and automatically determine if the subject comprises a repeat visitor.

The biometric based technique described herein can utilize face recognition, iris recognition or both and/or other biometric parameters to unobtrusively identify subjects from a distance. The system then presents to an operator or user, previously stored data about the subject. This data can include, but is not limited to, biographical information, hospitality preferences, past visit histories and so forth. In addition the previously stored data can be used to automatically generate a display message for the visitor such as "welcome back Mr. XXX your non-smoking room with a balcony is ready." Other instantiations may not show information to the visitor at all. If a subject has not been seen previously by the system and therefore is not in the database, the user or operation is provided with the option to enroll the subject and begin a visit history. The enrollment can also be accomplished unobtrusively.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
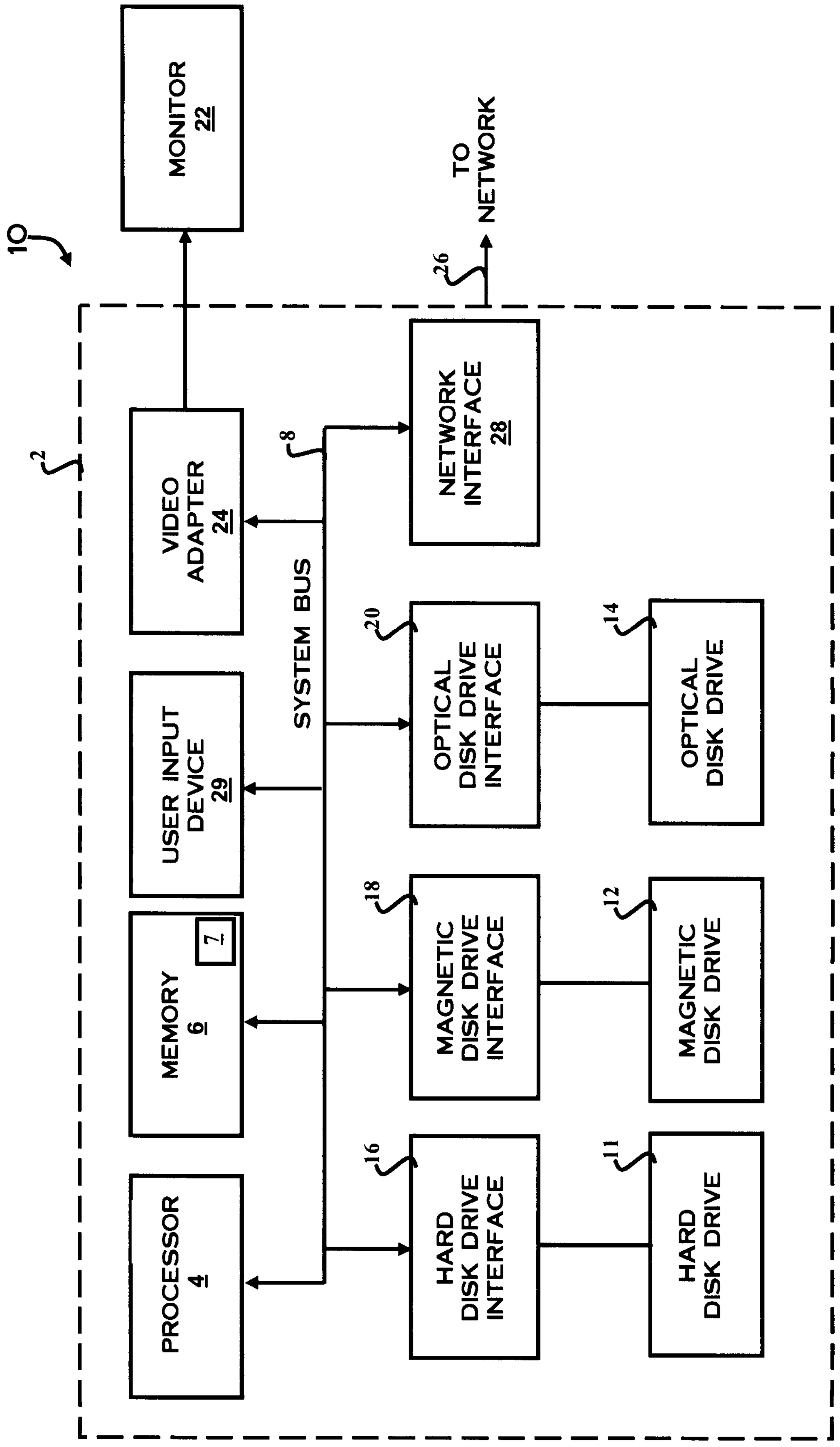
FIG. 1 illustrates a block diagram of a data-processing apparatus, which can be utilized to implement an embodiment.

FIG. 1 illustrates a block diagram of a data-processing apparatus 10, which can be utilized to implement a preferred embodiment. Data-processing apparatus 10 can be used to implement a method for distinctively displaying selected building features (e.g., floors) with sufficient details in a three-dimensional building model as described in greater detail herein. Data-processing apparatus 10 can be configured to include a general purpose computing device, such as a computer 2. The computer 2 includes a processing unit 4, a memory 6, and a system bus 8 that operatively couples the various system components to the processing unit 4. One or more processing units 4 operate as either a single central processing unit (CPU) or a parallel processing environment. Data-processing apparatus 10 represents only one of many possible data-processing devices or systems for implementing embodiments. Data-processing apparatus 10 can be provided as a stand-alone personal computer, portable/laptop computer, PDA (personal digital assistant), server, mainframe computer, and so forth.

The data-processing apparatus 10 generally includes one or more data storage devices for storing and reading program and other data. Examples of such data storage devices include a hard disk drive 11 for reading from and writing to a hard disk (not shown), a magnetic disk drive 12 for reading from or writing to a removable magnetic disk (not shown), and an optical disc drive 14 for reading from or writing to a removable optical disc (not shown), such as a CD-ROM or other optical medium. A monitor 22 is connected to the system bus 8 through an adapter 24 or other interface. Additionally, the data-processing apparatus 10 can include other peripheral output devices (not shown), such as speakers and printers. For example, a user input device 29, such as a mouse, keyboard, and so forth, can be connected to system bus 8 in order to permit a user to enter data to and interact with data-processing apparatus 10.

The hard disk drive 11, magnetic disk drive 12, and optical disc drive 14 are connected to the system bus 8 by a hard disk drive interface 16, a magnetic disk drive interface 18, and an optical disc drive interface 20, respectively. These drives and their associated computer-readable media provide nonvolatile storage of computer-readable instructions, data structures, program modules, and other data for use by the data-processing apparatus 10. Note that such computer-readable instructions, data structures, program modules, and other data can be implemented as a module or group of modules, such as, for example, module 7, which can be stored within memory 6.

Note that the embodiments disclosed herein can be implemented in the context of a host operating system and one or more module(s) 7. In the computer programming arts, a software module can be typically implemented as a collection of routines and/or data structures that perform particular tasks or implement a particular abstract data type.

Software modules generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus such as data-processing apparatus 10, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Any type of computer-readable media that can store data that is accessible by a computer, such as magnetic cassettes, flash memory cards, digital versatile discs (DVDs), Bernoulli cartridges, random access memories (RAMs), and read only memories (ROMs) can be used in connection with the embodiments.

A number of program modules can be stored or encoded in a machine readable medium such as the hard disk drive 11, the, magnetic disk drive 12, the optical disc drive 14, ROM, RAM, etc or an electrical signal such as an electronic data stream received through a communications channel. These program modules can include an operating system, one or more application programs, other program modules, and program data.

The data-processing apparatus 10 can operate in a networked environment using logical connections to one or more remote computers (not shown). These logical connections are implemented using a communication device coupled to or integral with the data-processing apparatus 10. The data sequence to be analyzed can reside on a remote computer in the networked environment. The remote computer can be another computer, a server, a router, a network PC, a client, or a peer device or other common network node. FIG. 1 depicts the logical connection as a network connection 26 interfacing with the data-processing apparatus 10 through a network interface 28. Such networking environments are commonplace in office networks, enterprise-wide computer networks, intranets, and the Internet, which are all types of networks. It will be appreciated by those skilled in the art that the network connections shown are provided by way of example and that other means of and communications devices for establishing a communications link between the computers can be used.

Figure 2:
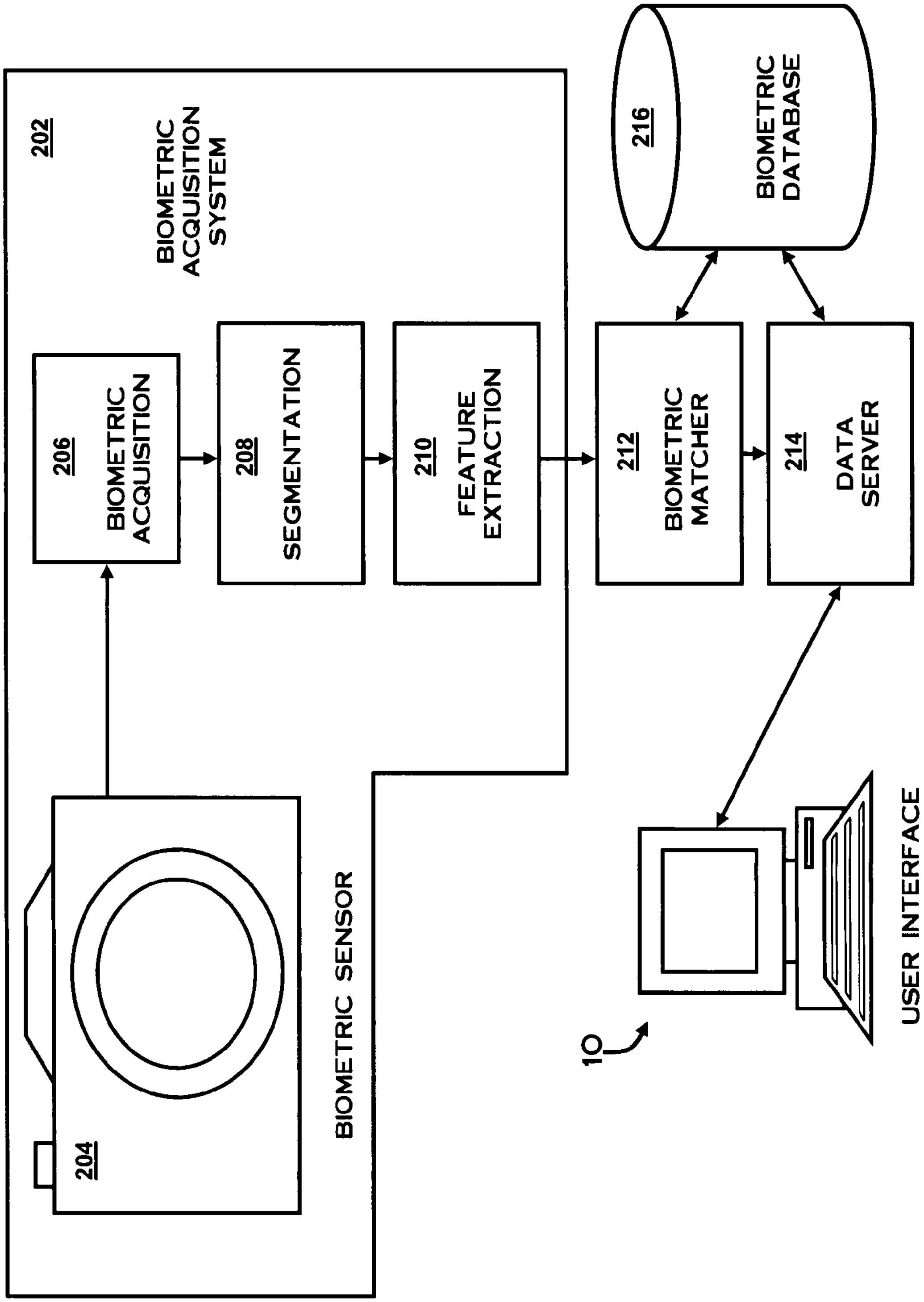
FIG. 2 illustrates a block diagram of a biometric-based repeat visitor recognition system, which can be implemented in accordance with a preferred embodiment.

FIG. 2 illustrates a block diagram of a biometric-based repeat visitor recognition system 200, which can be implemented in accordance with a preferred embodiment. System 200 generally includes a biometric acquisition system 202 that communicates with a biometric matcher 212, which in turn provides data to a data server 214. The biometric matcher 212 and the data server 214 both can send and retrieve data from a biometric database 216. The data server 214 can communicate with a data-processing apparatus, such as the data-processing apparatus 10 illustrated in FIG. 1. The data-processing apparatus 10 generally provides a user interface that an operator or user may access and operate for biometric recognition and authentication of a user, as described in greater detail herein.

The biometric acquisition system 202 is generally coupled with the biometrics matcher 212, the database 216 and the data server 214. The biometric acquisition system 202 includes a biometric sensor 204 that detects and acquires via a biometric acquisition module 206, one or more images of a subject's face and/or iris. The images are then segmented via a segmentation module 208 and then relative features are extracted via an extraction module 210. The biometric repeat visitor recognition system 200 utilizes the results of the biometric acquisition system 202, using the biometric matcher 212, to compare these results to stored biometrics of previous visitors from the biometric database 216. In addition to biometric information the database 216 also can contain biographical, hospitality preference, and past visit history information about the subjects. The data server 214 passes the results of the matcher 212 along with any stored information about the subject, to the user interface provided by data-processing apparatus 10. The user interface displays this information for use by a user or operator. Information from the database may also be used to generate an automated display for the visitor. The user interface allows users to add additional information about the subject to be placed back into the database 216 by the data server 214.

If the matcher 212 does not find a match in the database 216, the user interface provides the user with the opportunity to enroll the subject in the database 216. An optional operating mode would do an automatic enrollment of subjects not matched. The user then has an option to add additional information on the subject to be placed in the database 216 for future use. The user interface also provides functions for maintenance of the database 216 such as editing, deleting or importing and exporting records. A common database format can allow data records to be shared across multiple systems at multiple locations. Note that the modules 206, 208, 210 can be implemented as software modules, as described previously. Additionally, the biometric matcher 212 can also be provided as a software module, depending upon design considerations.

Figure 3:
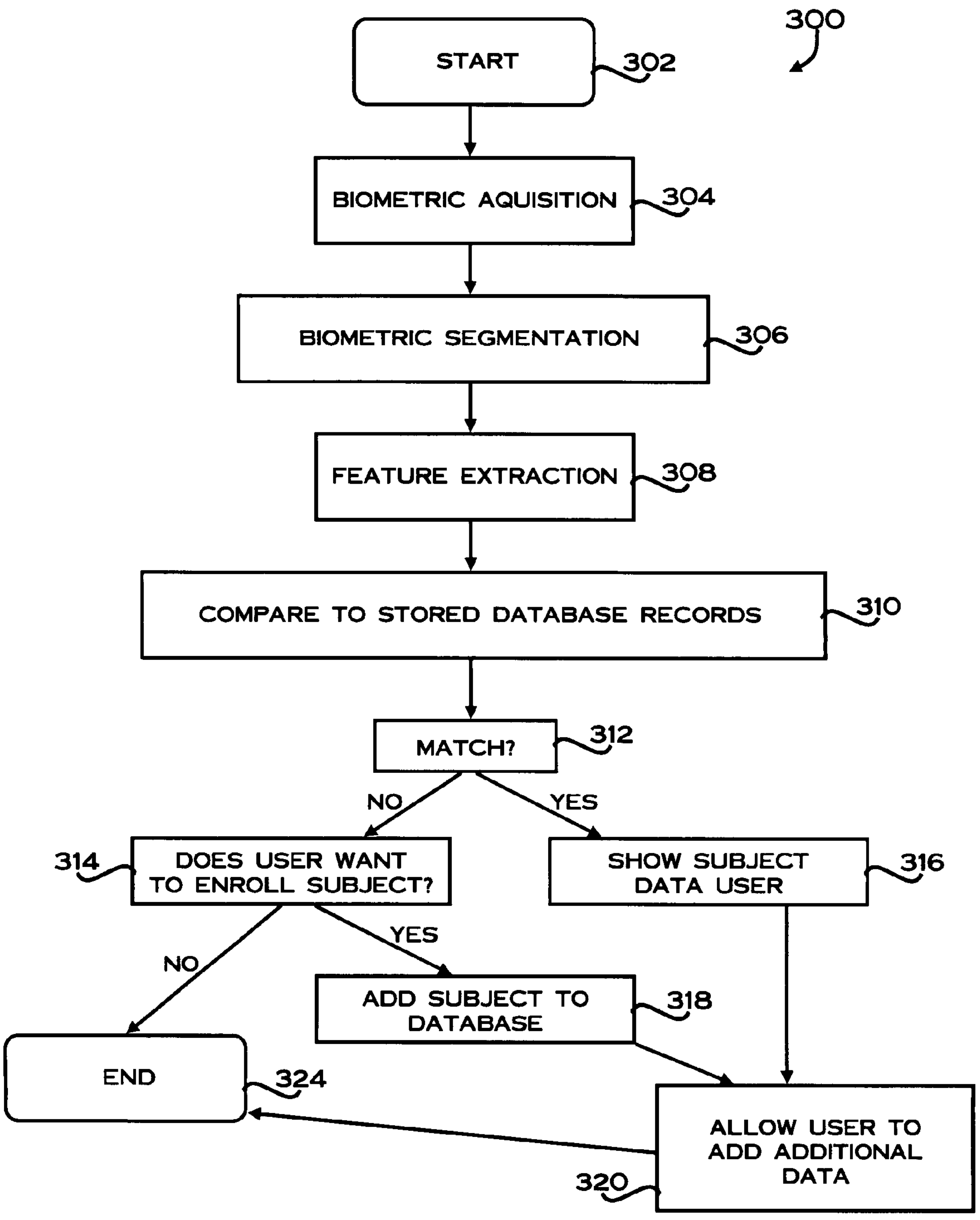
FIG. 3 illustrates a high-level flow chart of operations depicting logical operational steps, which can be followed in order to implement a preferred embodiment.

FIG. 3 illustrates a high-level flow chart 300 of operations depicting logical operational steps, which can be following in order to implement a preferred embodiment. As indicated at block 302, the process begins. Next, as depicted at block 304, biometric data can be acquired from a subject. Thereafter, as illustrated at block 306, a biometric segmentation operation can be processed in which particular biometric features acquired from the subject is segmented. Next, as depicted at block 308, such biometric features are extracted. Thereafter, as illustrated at blocks 310 and 312, the results of the segmentation and extraction operations are compared to stored biometrics of previous visitors maintained in the biometric database 216. The biometric matcher 212 described earlier can be used to compare the results to data contained in the biometric database 216. If match is identified then the operation depicted at block 316 is processed in which the resulting subject data is displayed via a user interface of data-processing apparatus 10 to the user. The subject data could also be used to automatically generate a display message for the subject. Next, as indicated at block 318, the user can be allowed to submit additional information about the subject to the database 216. Following processing of the operation depicted at block 318, the process can then terminate, as indicated at block 324.

Assuming that a match is not found, as indicated at block 314, a test is processed to determine if the user/operator desires to enroll the subject (i.e., information about the subject, including the acquired biometric information) in the database 216. If it is determined not to proceed with enrollment, then the operation terminates, as indicated at block 324. If, however, it is determined to enroll the subject information in the database 216, then as illustrated at block 318, the user is permitted to add information to the database 216. The user can then add other information, as indicated at block 320. In some operating modes block 314 may be set to enroll all new visitors. The process can then terminate, as illustrated at block 324. The process repeats for each visitor.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A biometric recognition method, comprising:

unobtrusively detecting and acquiring biometric data associated with a subject, wherein said subject is located and displayed on a floor of a three-dimensional building model, wherein a data-processing apparatus implements said three-dimensional building model;

segmenting and extracting particular biometric features from said biometric data;

comparing said particular biometric features to biometric data previously stored in a database in order to determine if said particular biometric features match said biometric data previously stored in said database and thereby rapidly and automatically determine if said subject comprises a repeat visitor; and automatically enrolling said particular biometric features acquired from said subject in said database if said particular biometric features do not match said biometric data previously stored in said database.

2. The method of claim 1 further comprising detecting said biometric data associated with said subject utilizing a biometric sensor.

3. The method of claim 1 further comprising configuring said database to store biographical information associated with said subject.

4. The method of claim 1 further comprising configuring said database to store hospitality preferences associated with said subject.

5. The method of claim 1 further comprising configuring said database to store past visitation information associated with said subject.

6. The method of claim 1 further comprising providing a user an opportunity to enroll said particular biometric features acquired from said subject in said database if said particular biometric features do not match said biometric data previously stored in said database.

7. The method of claim 1 further comprising offering said user an opportunity to provide additional information about said subject in said database.

8. The method of claim 1 further comprising providing a display of personalized information to a visitor based on information obtained from said database.

9. A biometric recognition system, comprising:

a data-processing apparatus;

a module executed by said data-processing apparatus, said module and said data-processing apparatus being operable in combination with one another to:

unobtrusively detect and acquire biometric data associated with a subject, wherein said subject is located and displayed on a floor of a three-dimensional building model, wherein said data-processing apparatus implements said three-dimensional building model;

segment and extract particular biometric features from said biometric data;

compare said particular biometric features to biometric data previously stored in a database in order to determine if said particular biometric features match said biometric data previously stored in said database and thereby rapidly and automatically determine if said subject comprises a repeat visitor; and automatically enroll said particular biometric features acquired from said subject in said database if said particular biometric features do not match said biometric data previously stored in said database.

10. The system of claim 9 wherein said database stores biographical information associated with said subject and wherein said biographical information is retrievable by a user.

11. The system of claim 9 wherein said database stores hospitality preferences associated with said subject that is retrievable by a user and wherein said hospitality information is retrievable by a user.

12. The system of claim 9 wherein said database stores past visitation information associated with said subject and wherein said past visitation information is retrievable by a user.

13. The system of claim 9 further comprising a user interface that prompts a user to enroll said particular biometric features acquired from said subject in said database if said particular biometric features do not match said biometric data previously stored in said database.

14. The system of claim 9 further comprising a user interface that prompts a user to provide additional information about said subject in said database.

15. A biometric-based repeat visitor recognition system, comprising:

a server and at least one portable computing console device that communicates with said server wherein said at least portable computing console device unobtrusively detects and acquires biometric data associated with a visitor, wherein said visitor is located and displayed on a floor of a three-dimensional building model, wherein a data processing apparatus implements said three-dimensional building model;

an interactive user interface associated with said at least one portable computing console device for displaying said acquired biometric data associated with said visitor; and a processor for segmenting and extracting particular biometric features from said biometric data, and comparing said particular biometric features to biometric data previously stored in a database in order to determine if said particular biometric features match said biometric data previously stored in said database and thereby rapidly and automatically determine if said visitor comprises a repeat visitor.

16. The system of claim 15 further comprising a display screen associated with said portable computing device for displaying alerts and status information of said segmentation, extraction, and comparison.

17. The system of claim 15 further comprising a biometric sensor that collects at least one image of said visitor's face.

18. The system of claim 15 wherein said interactive user interface provides an enrollment feature to enroll said visitor's identification information.

19. The system of claim 15 wherein said at least one portable computing console device comprises a personal digital assistant, a portable computer, or a laptop computer.

* * * * *